June 26, 1956     E. L. NELSON     2,751,622

CASTER WHEEL MOUNTING

Filed Aug. 3, 1953     2 Sheets-Sheet 1

INVENTOR.
Elmer L. Nelson
BY *Schraeder, Merriam, Hofgren & Brady*
ATTORNEY.

June 26, 1956      E. L. NELSON      2,751,622
CASTER WHEEL MOUNTING
Filed Aug. 3, 1953      2 Sheets-Sheet 2
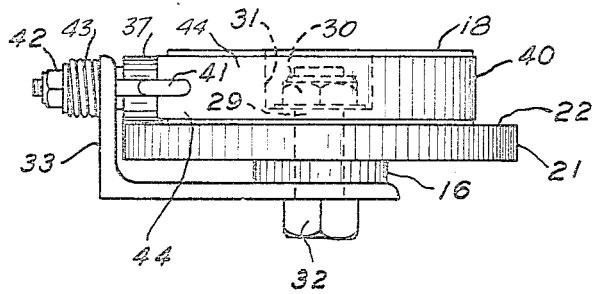
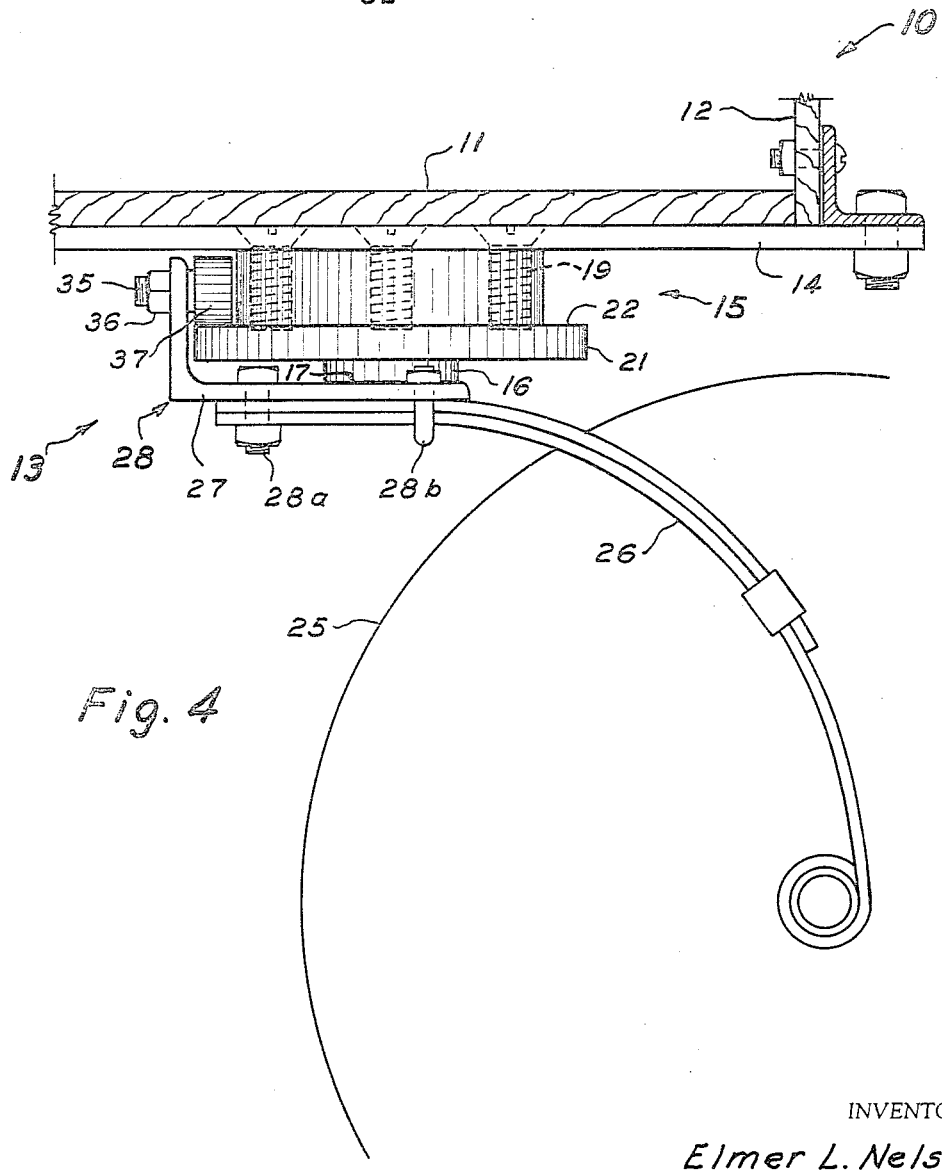
INVENTOR.
Elmer L. Nelson
BY Schroeder, Merriam,
Hofgren, & Brady
ATTORNEY.

United States Patent Office 2,751,622
Patented June 26, 1956

2,751,622

CASTER WHEEL MOUNTING

Elmer L. Nelson, Chicago, Ill.

Application August 3, 1953, Serial No. 371,961

5 Claims. (Cl. 16—35)

This invention relates to a caster wheel mounting and more particularly to a swivel type mounting for caster wheels.

It is the general object of this invention to produce a new and improved caster wheel mounting.

It is a more specific object of the invention to produce a caster wheel mounting provided with means for offsetting the thrust imparted to the mounting by an offset caster wheel.

Yet another object of the invention is to provide a caster wheel mounting having a thrust surface and a bearing surface together with a bracket member for carrying the caster wheel rotatably engaging the bearing surface and provided with a thrust offsetting member engaging the thrust surface so as to produce a mounting which is smooth in operation and not subject to rapid wear because of the offset thrust forces produced.

A further object of the invention is to produce a mounting of the type described in the preceding paragraph including a brake surface together with braking means for resisting relative rotation between the bracket and member providing the braking surface.

Other and further objects of the invention will be readily apparent from the following description and drawings, in which:

Fig. 3 is a side elevational view of a portion of the apparatus shown in Fig. 1; and Fig. 4 is a side elevational view of the device of Fig. 1, but with certain parts removed for clarity of illustration.

Figure 1:
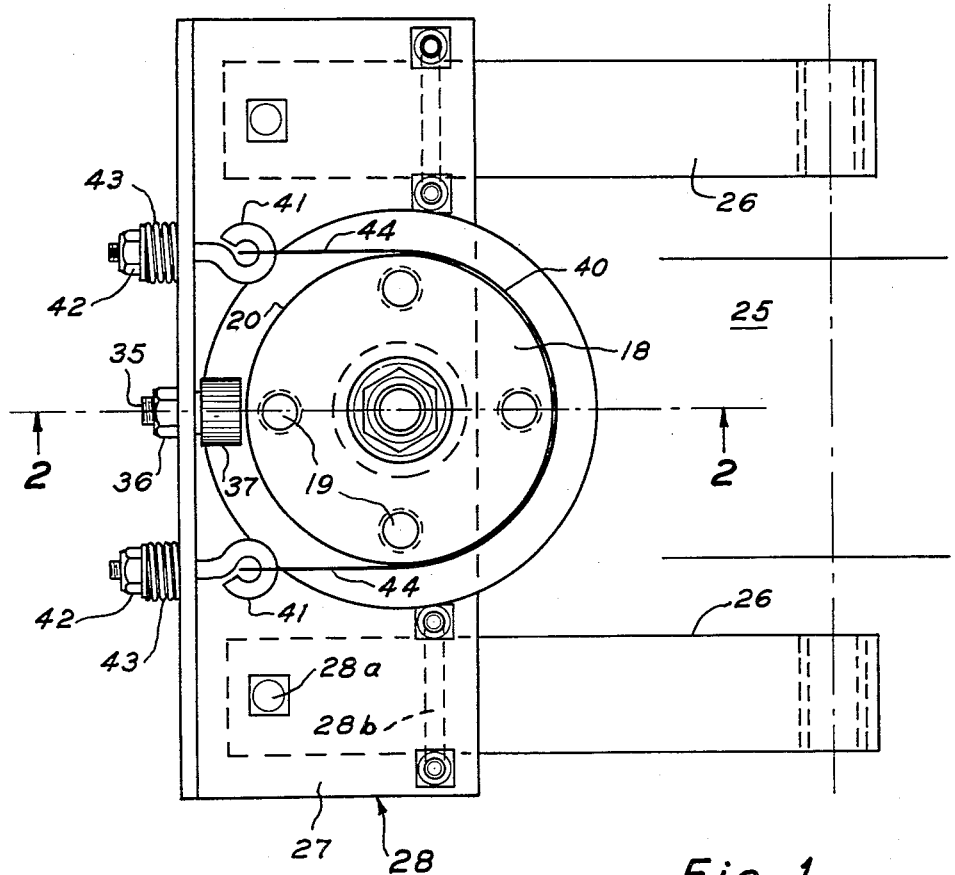
Fig. 1 is a top elevational view showing a caster wheel mounting incorporating the invention.
Figure 2:
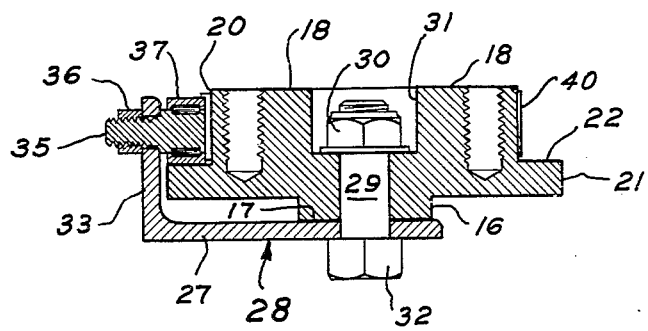
Fig. 2 is a vertical sectional view along line 2—2 of Fig. 1.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

In the normal construction of swivel mountings for caster wheels it has been customary to provide a bracket to which is secured an arm or arms carrying the caster wheel, with the wheel being offset from the bracket, together with means for rotatably mounting the bracket on a trailer or other device to which the caster wheel is applied. As the caster wheel is offset from the bracket (normally rotating about an axis spaced rearwardly from the bracket), a thrust or twisting force is applied to the bracket bearing. As the bearing generally comprises two relatively wide surfaces, the twisting force tends to separate the bearing surfaces positioned on the opposite side of the pivot point of the caster wheel and simultaneously to urge the bearing surfaces on the same side of the pivot point as the caster wheel into tight engagement. Such a construction wears out relatively rapidly inasmuch as the separated portions permit the entrance of dirt, grit and other foreign material while the opposite portions are tightly urged together so as to increase the wear therebetween, particularly with rotation of the swivel joint which permits the foreign matter which has entered the separated portion to penetrate the pressed together portions.

According to the present invention, however, there is provided a caster wheel mounting which is not subject to the difficulties described above in that means are provided for offsetting the thrust or twisting force just described so as to permit the bearing surfaces to mate throughout their entire extent. Furthermore, means are provided for preventing "shimmy" of the caster wheel due to rapid but relatively slight swiveling movements of the mounting, thus to provide a smoother running caster wheel.

Referring now to the drawings, the caster mounting of the present invention is shown as secured to the rear portion 10 of a trailer or similar device which is provided with a bottom 11 and a vertical end wall 12. The swivel joint 13 of the present invention is fixed to a plate 14 secured to the bottom wall 11 of the trailer and includes a member 15 formed to have a circular bottom 16 having a lower surface 17 providing a bearing. The member 15 also provides a top cylindrical portion 18 having a plurality of threaded holes to receive screws 19 to secure the member 15 to the plate 14. The top cylindrical portion 18 also provides a brake surface 20 for the purposes hereafter to be described.

Intermediate the top portion 18 and the bottom portion 16 the member is provided with an annular flange 21 providing an annular thrust surface 22.

A trailer wheel indicated at 25 is rotatably carried by a pair of arms 26, preferably made of leaf spring material, each secured to the bottom of a horizontal portion 27 of a bracket 28 by means of bolts 28a and U-brackets 28b. The bracket 28 is rotatably secured to the member 15 by means of a shaft 29 extending through suitable openings in the bracket and member and held in place by a nut 30 at its top seated in a recess 31 formed in the upper surface 18 of the member and a lower nut 32.

The bracket 28 is also provided with a vertical portion 33 to which is threadedly secured a shaft 35 locked in place by means of a lock nut 36. The shaft carries a roller 37 rotatably mounted thereon and positioned to bear against the thrust surface 22.

It will be noted from a study of Fig. 4 that the offset mounting of the caster wheel 25 produces a turning force on the bracket 28. As the upper face of the bracket engages the bearing surface 17, such twisting or turning force caused by the offset mounting of the wheel would tend to separate the left-hand portions (as seen in Fig. 4) of the mating surfaces of the bracket and bearing surface 17 while simultaneously urging the right-hand portions thereof into tight engagement, causing the difficulty previously mentioned. The thrust roller 37, however, serves to counteract the twisting force just described and to apply such force against the thrust surface 22. It will be noted that the roller 37 is carried by the bracket and thus the counteracting forces are applied directly through the bracket. Because of the provision of the thrust roller the nuts 30 and 32 need not be drawn down excessively tightly as is required where the bearing surfaces of the bracket and member are expected to absorb the entire twisting force, and thus a free and easily rotatable connection may be provided and thus one which does not wear readily. Inasmuch as the rotatable connection between the bracket and the member 15 may be made relatively free, some difficulty may be experienced with "shimmy," particularly when the trailer 10 is drawn at relatively low speeds over rough pavement, for example cobblestones. To alleviate any difficulty of this nature braking means are provided for holding the bracket against rotation relative to the member except when the trailer is actually being turned. For this purpose there is provided a brake band 40 attached at each end to a pair of hooks 41 which extend through suitable openings in the vertical portion 33 of the bracket and provided with nuts 42 at their outer ends. Compressed between the nuts and the outer side walls of the vertical portion 33 of the bracket are compression springs 43, the compression of which may be adjusted by adjustment of the nuts 42. Thus, the braking effect of the band against the braking surface 20 may be adjusted to produce the precise degree of freedom of movement desired.

A further feature of the brake band, as will be noted from a study of Fig. 3, is that the portion 44 of the band extending between the portion wrapped around the braking surface and the hooks closely overlies the thrust surface 22 and thus has a tendency to scrape off debris or foreign material which might otherwise accumulate thereon. Thus, undue wear of the thrust surface 22 and the surface of the roller 37 is prevented.

I claim:

1. A caster wheel mounting comprising a member providing a bearing surface, a brake surface, and a thrust surface, a bracket secured to the member for rotation about a substantially vertical axis and having a surface portion engaging said bearing surface, a supporting arm secured to the bracket and extending away from said bracket on one side of said vertical axis means on the outer end of said arm for rotatably carrying the caster wheel, brake means on the bracket, means for urging the brake means into braking engagement with said brake surface, and a thrust roller rotatably carried by the bracket and engaging the thrust surface on the other side of said vertical axis.

2. A mounting for securing a caster wheel to a trailer or the like comprising a member having a flat substantially circular base forming a horizontal bearing surface, a cylindrical top portion having vertical side walls which form a brake surface and an annular horizontal flange intermediate the top and base the upper surface of which forms a thrust surface; a bracket secured to the member for rotation about a substantially vertical axis and having a surface portion engaging said bearing surface; a pair of supporting arms secured to the bracket on opposite sides of and substantially equidistant from said axis of rotation, each of said arms extending away from said bracket on one side of said axis; means on the outer ends of said arms for rotatably carrying the caster wheel; brake means on the bracket engaging said brake surface; a thrust roller rotatably carried by the bracket and engaging the thrust surface on the other side of said axis of rotation; and means for rigidly securing said member to the trailer.

3. A mounting for securing a caster wheel to a trailer or the like comprising a member having a flat substantially circular base forming a bearing surface, a cylindrical top portion the side walls of which form a brake surface and an annular flange intermediate the top and base the upper surface of which forms a thrust surface; a bracket having a vertical portion and having a horizontal portion secured to the member for rotation about a substantially vertical axis, said horizontal portion having a flat surface engaging said bearing surface; a pair of supporting arms secured to the horizontal portion of the bracket on opposite sides of and substantially equidistant from said axis of rotation, each of said arms extending away from said bracket on one side of said axis; means on the outer ends of said arms for rotatably carrying the caster wheel; brake means on the bracket engaging said brake surface; a thrust roller rotatably carried by said vertical portion of the bracket and engaging the thrust surface on the other side of said axis of rotation; and means for rigidly securing the top portion of the member to the underside of the trailer.

4. A mounting for securing a caster wheel to a trailer or the like comprising a member having a flat substantially circular base forming a bearing surface, a cylindrical top portion the side walls of which form a brake surface and an annular flange intermediate the top and base the upper surface of which forms a thrust surface; a bracket having a vertical portion and having a horizontal portion secured to the member for rotation about a substantially vertical axis, said horizontal portion having a flat surface engaging said bearing surface; a pair of supporting arms secured to the horizontal portion of the bracket on opposite sides of and substantially equidistant from said axis of rotation, each of said arms extending away from said bracket on one side of said axis; means on the outer ends of said arms for rotatably carrying the caster wheel; a brake band having its ends resiliently secured to said vertical portion of the bracket with an intermediate portion wrapping around said brake surface and with said brake band having a portion closely overlying said thrust surface in position to scrape foreign material from said thrust surface with relative rotation between the member and the bracket; a thrust roller rotatably carried by said vertical portion of the bracket and engaging the thrust surface on the other side of said axis of rotation; and means for rigidly securing the top portion of the member to the underside of the trailer.

5. A mounting for securing a caster wheel to a trailer or the like comprising a member providing a bearing surface, a brake having a generally cylindrical surface portion and a thrust surface; a bracket secured to the member for rotation about a substantially vertical axis and having a surface portion engaging said bearing surface; a pair of supporting arms secured to the bracket on opposite sides of and substantially equidistant from said axis of rotation, each of said arms extending away from said bracket on one side of said axis; means on the outer ends of said arms for rotatably carrying the caster wheel; a brake band on the bracket and engaging the brake surface portion; means constantly urging the brake band against said surface portion to cause said band frictionally to grip said surface portion; a thrust roller rotatably carried by the bracket and engaging the thrust surface on the other side of said axis of rotation; and means for rigidly securing said member to the trailer.

References Cited in the file of this patent

UNITED STATES PATENTS

| Re. 23,459 | Budnick et al. | Feb. 12, 1952 |
| 374,420 | Michelson | Dec. 6, 1887 |
| 2,181,722 | Butter et al. | Nov. 28, 1939 |
| 2,469,152 | Brown | May 3, 1949 |
| 2,480,524 | Vallone et al. | Aug. 30, 1949 |
| 2,481,948 | Pruitt | Sept. 13, 1949 |
| 2,502,894 | Schlums | Apr. 4, 1950 |
| 2,564,996 | Rasbach | Aug. 21, 1951 |

FOREIGN PATENTS

| 1,980 | Great Britain | of 1887 |
| 14,960 | Great Britain | of 1885 |
| 114,371 | Germany | Nov. 5, 1900 |